Figure 1:
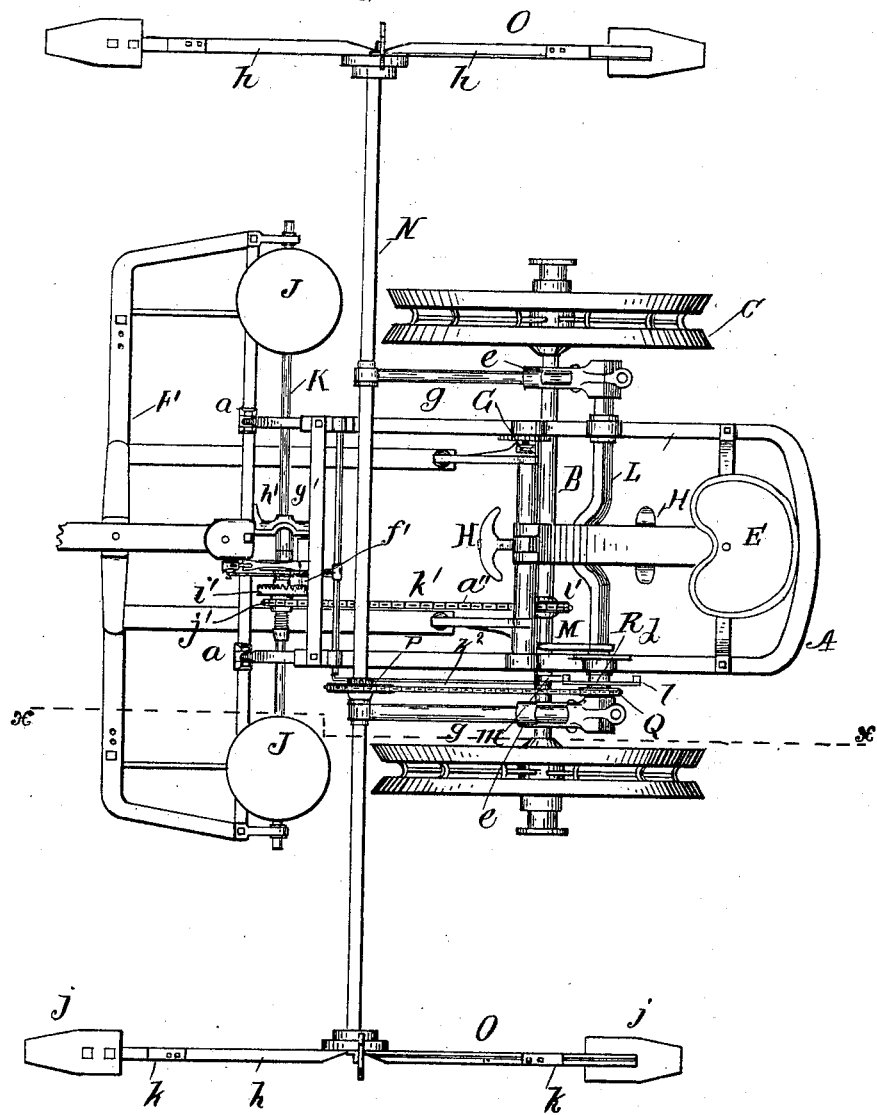

(No Model.)

4 Sheets—Sheet 1.

J. B. JARMIN.
CHECK ROW CORN PLANTER.

No. 596,516.　　　　　　　　　Patented Jan. 4, 1898.

Witnesses.　　　　　　　　　　　　　　　　Inventor.
William J. Peck.　　　　　　　　　　　James B. Jarmin
Bernard J. Mansfield　　　　　　　by Chas. M. Peck,
　　　　　　　　　　　　　　　　　　　　his Attorney.

(No Model.)
4 Sheets—Sheet 2.
J. B. JARMIN.
CHECK ROW CORN PLANTER.
No. 596,516.  Patented Jan. 4, 1898.
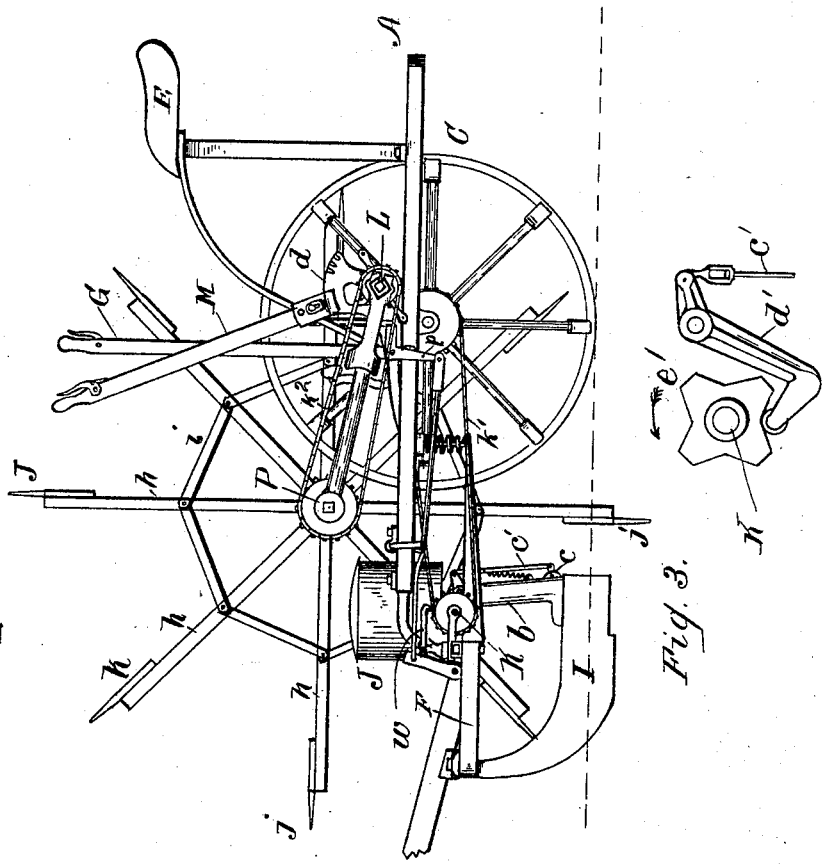
Witnesses.
William J. Peak.
Bernard J. Hausfeld
Inventor.
James B. Jarmin
by Chas. M. Beck
his Attorney.

(No Model.)
4 Sheets—Sheet 3.
J. B. JARMIN.
CHECK ROW CORN PLANTER.
No. 596,516.
Patented Jan. 4, 1898.
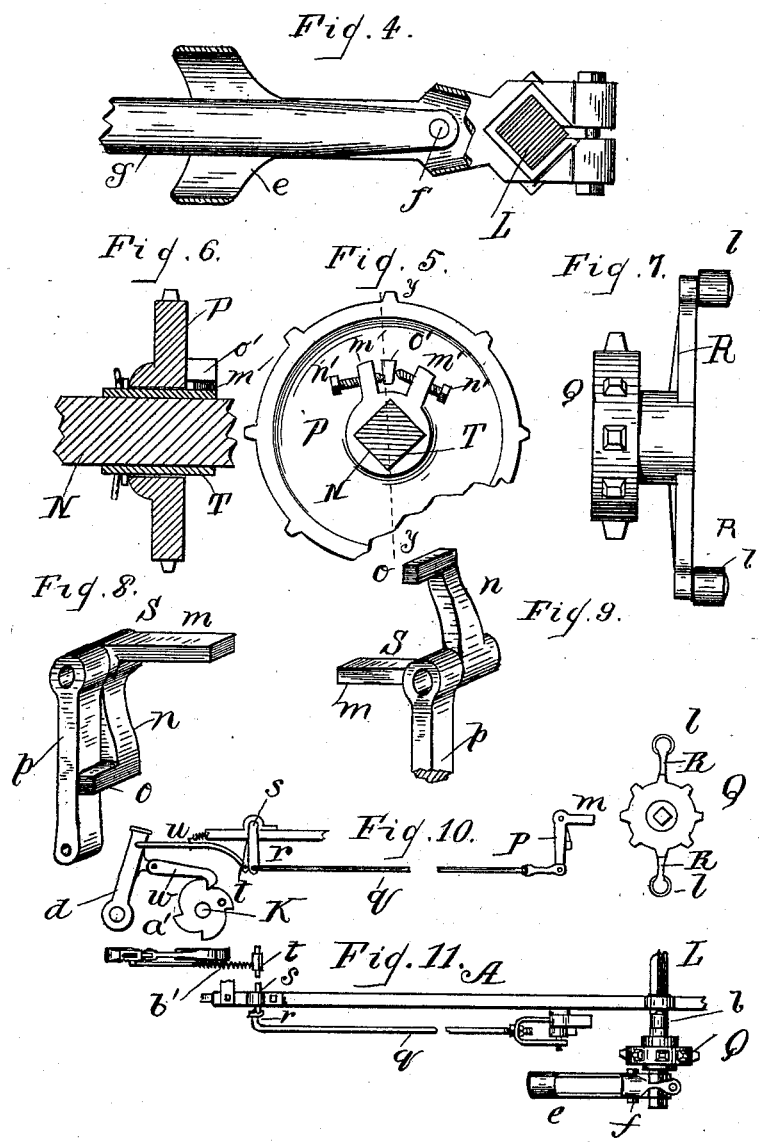
Witnesses.
William J. Peck.
Bernard J. Hausfeld.
Inventor.
James B. Jarmin
by Chas. M. Peck
his Attorney.

(No Model.) 4 Sheets—Sheet 4.

J. B. JARMIN.
CHECK ROW CORN PLANTER.

No. 596,516. Patented Jan. 4, 1898.

WITNESSES:
William J. Peck.
William A. Fay.

INVENTOR
James B. Jarmin
BY Chas. M. Peck
his ATTORNEY

UNITED STATES PATENT OFFICE.

JAMES B. JARMIN, OF DAYTON, OHIO.

CHECK-ROW CORN-PLANTER.

SPECIFICATION forming part of Letters Patent No. 596,516, dated January 4, 1898.

Application filed November 16, 1896. Serial No. 612,235. (No model.)

*To all whom it may concern:*

Be it known that I, JAMES B. JARMIN, a citizen of the United States, residing at Dayton, in the county of Montgomery and State of Ohio, have invented certain new and useful Improvements in Corn-Planters, of which the following is a full, clear, and exact description, reference being had to the accompanying drawings, forming part of this specification.

My invention relates to that class of planters known as "check-row" planters, in which the seed is deposited automatically in straight rows across the field, the rows being not only straight in the direction of the path of the machine, but also at right angles or diagonal thereto, as is well understood in this art; and it has for its object several distinct improvements whereby the machine is not only simplified in construction and its reliability and efficiency increased, but the use of a check-row wire is dispensed with entirely, and while primarily my invention is intended for a check-row planter the latter can conveniently and without loss of time be changed to a drill.

The first idea of means embodied in my present invention consists in providing a member, such as one or a pair of spade wheels revoluble by contact with the earth and the traction of the machine, which member is geared to clutch mechanism controlling the seed dropping and depositing mechanism, and in connecting said seed-dropping mechanism by gearing with a separate revoluble member actuated by the traction of the machine, so that the first member accurately spaces off the required distance between the rows and then instantly actuates the seed-depositing mechanism to put the seed in the furrows, and by the same act puts into gear the seed-dropping mechanism, which by the other revoluble member and the traction of the machine deposits the grains in the spout or runners ready for the next drop.

The second idea of means consists in so mounting the revoluble spacing member upon the machine that it shall be self-adjustable to the surface of the ground, to which it is held in proper working contact by gravity alone, so as to insure the proper working of all the parts without twisting or other strains, and so that in going back across the field the spacing spades or points will correctly register with the marks made previously on the foregoing trip and thereby insure straight planting.

Other novel ideas of means for insuring the simplicity and efficiency of the machine are also embodied, as will hereinafter appear, and the invention will be hereinafter set forth, and specifically pointed out in the claims.

Figure 12:
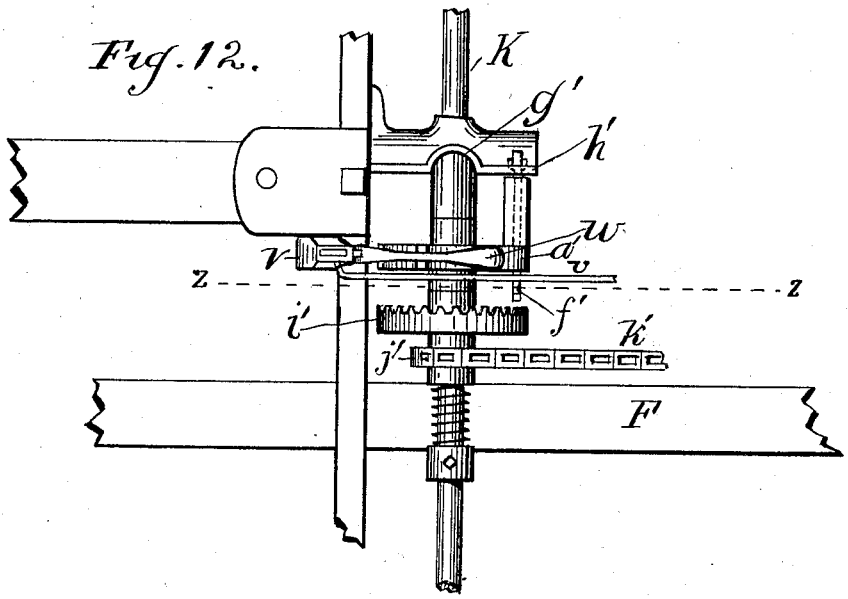
Figure 13:
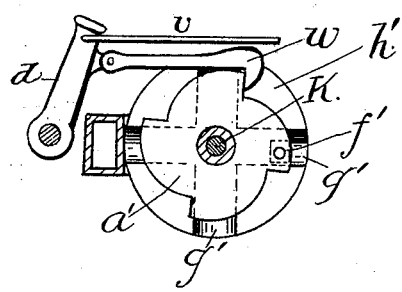

In the accompanying drawings, Figure 1, Sheet 1, is a plan view of a corn-planter embodying my invention. Fig. 2, Sheet 2, is a sectional side elevation on the dotted line $xx$ of Fig. 1. Fig. 3, Sheet 2, is an enlarged detail side elevation of the spout-valve-actuating mechanism. Fig. 4, Sheet 3, is an enlarged side elevation, partly in section, of one of the attaching devices for the spacing member or spade-wheels. Fig. 5, Sheet 3, is an enlarged broken side elevation of the adjustable sprocket in the valve-actuating gear. Fig. 6, Sheet 3, is an axial elevation on the dotted line $y\,y$ of Fig. 5. Fig. 7, Sheet 3, is an enlarged plan view of the tripping-arms and connected sprocket. Figs. 8 and 9, Sheet 3, are perspective views of the two-part tripping bell-crank in its two positions, respectively. Fig. 10, Sheet 3, is a broken side elevation of the actuating-gearing. Fig. 11, Sheet 3, is a plan view of Fig. 10. Fig. 12, Sheet 4, is an enlarged plan view in detail of the clutch mechanism and its associated parts. Fig. 13, Sheet 4, is a side elevation on the dotted line $z\,z$ of Fig. 12, looking toward the top of the sheet.

The same letters of reference are used to indicate identical parts in all the figures.

The preferred form of planter to which my invention is applicable, but by no means restricted thereto, is one having a main-wheel frame A, supported on the usual axle B, with carrying and pressing wheels C and driver's seat E. Hinged, as at $a$, in the usual or any suitable manner, to the main frame is the runner-frame F, coupled by spring and lever connections, as usual or suitable, to the main frame for raising or lowering the runner-frame by a hand-lever G or foot-lever H, or both combined. Upon the runner-frame are the usual or any suitable furrow-opening runners I, with spout-shanks b, communicating with the seed-depositing mechanism in the usual or suitable seedboxes J on the runner-frame. There are the usual valves c in the lower ends of the spouts, actuated, as hereinafter explained, by the shaft K, journaled on the runner-frame and geared to the seed-dropping plates in the boxes J.

All of the foregoing parts are well known in the art and require no further description here.

Journaled transversely of the main frame, slightly above and in rear of the axle, is a shaft L, to which is rigidly secured a hand lock-lever M, coacting with a segment-rack d upon the main frame. Rigidly but removably secured upon the ends of the shaft L are two socket-pieces e, Figs. 2, 4, and 11, inclined forward in the same plane and having pivoted therein, as at f, Fig. 4, forwardly-extending arms g, in the forward ends of which is journaled a horizontal transverse shaft N, occupying a position between the carrying-wheels C and the seedboxes J. Upon the ends of this shaft N, which project beyond the wheels C and seedboxes J, are secured two spider spacing-wheels O, Figs. 1 and 2. These wheels are composed of a hub rigidly secured to the shaft N in any suitable manner and carrying radial arms h, preferably eight in number and equidistant and connected by braces i, Fig. 2, to prevent flexure. Four of the alternate arms of each spacing-wheel have secured to their ends broad spading-points j, and these latter constitute the markers, while the intermediate arms need only have narrower engaging points k to insure the regular and continuous rotation of the spacing-wheels and shaft N.

From the foregoing description it will be seen that the wheels O rest upon the ground with the spading-points penetrating the earth, and that by reason of the hinged joint between the arms and socket-pieces e the spacing-wheels, together with the shaft N, may not only have simultaneous vertical play, but each spacing-wheel may have independent vertical play to follow inequalities in the surface of the ground or inequalities in the density of the earth without in the least disturbing the transverse alinement of the shaft N. In going to or from the field the driver actuates the hand-lever M to raise the shaft N sufficiently to take the spacing-wheels out of contact with the earth, as will be readily understood.

Rigidly secured upon the shaft N is a sprocket-wheel P, Figs. 1, 2, 5, and 6, from which a drive-chain extends back and around a sprocket-wheel Q, loosely journaled on the shaft L. The hub of the sprocket-wheel Q has two arms R, diametrically set on the ends of which are pivoted tappet-rollers l, Fig. 7, whose path of rotation is over a two-part bell-crank lever S, pivoted to the main frame, Figs. 8, 9, 10, and 11. One part of this bell-crank lever is composed of a horizontal arm m and a pendent arm n, having a side lug o, Fig. 8, engaging the pendent member p, the construction being such that when in the position shown in Fig. 8 the rollers l in engaging the member m will press it down and press forward the arm p, though when desired to disconnect the parts the members m n may be turned up and forward, as seen in Fig. 9, so as to be entirely out of the path of the rollers l. As seen in Figs. 10 and 11, the lower end of the pendent piece p is pivotally connected by a forwardly-extending link q with the crank-arm r of a shaft s, journaled on the main frame and having a second crank-arm t, pivotally connected by a link u with a pivoted dog-carrier d on the runner-frame, which dog-carrier is provided with a dog w, engaging a ratchet a', fast on the shaft K. Any suitable resetting-spring b' is arranged in this train of gearing, and in this instance it is connected to the crank-arm t and the link u for resetting the parts after the roller l has pressed down and passed the arm m of the bell-crank. The valves c in the spouts are connected by spring resetting rods, c', with levers d', Fig. 3, engaged by tappet-rollers e', fast on the shaft K, adjacent to the spouts.

From the foregoing description and from the adjustment of the parts it will be seen that as soon as a spade or marking-point j touches the ground in line with the heel of the runner, or, which is the same thing, the discharge end of the spout, at that instant one of the rollers l will have engaged and pressed down the bell-crank piece m, and thereby, through the connections just above described, will have thrown forward the dog w and will have oscillated the shaft K sufficiently to cause the opening of the valves c to deposit the seed sustained by them in the spouts directly into the furrows, and this movement of the shaft K, it will be observed, is accomplished entirely by the check-row mechanism actuated by direct contact with the ground. This initial movement of the shaft K, however, actuates a clutch mechanism which is composed of a spring-dog f', (see particularly Figs. 12 and 13,) having its housing in and guided through the ratchet a', one end of which, against the normal tension of the spring, occupies one of a series of recesses g' in a fixed disk or plate h', concentric with the shaft K, and the other or nose end of which, when the shaft is given its initial start by the check-row mechanism, is forced into engagement with a crown-gear i', loose upon the shaft K and carrying a sprocket-wheel j', connected by a drive-chain k' with a sprocket-wheel l', revoluble with the axle B of the main frame in such manner that the initial movement of the shaft K by the check-row mechanism locks said shaft, through the medium of the mechanism just described, to the sprocket l', and the shaft K is then given further movement by the traction of the machine to rotate the seed-plates in the boxes J and deposit fresh charges in the spouts over the valves c. As soon as the end of the dog f' comes opposite the succeeding depression $g'$ in the plate $h'$ its spring disconnects it from the gear $i'$ and the shaft K comes to rest until the next spacing-marker sets the parts in motion again.

As a simple and convenient means for adjusting the spading-markers in relation to the rollers $l$, so as to exactly time the operation of the latter upon the arms $m$, I secure the gear P, Figs. 5 and 6, on a sleeve T, fast on the shaft N, which sleeve has on one end a pair of lugs $m'$, with set-screws $n'$ engaging through the same and bearing upon a lug $o'$, projecting from the side of the sprocket P, so that said sprocket may be adjusted on the shaft N, and thereby bring the rollers $l$ into proper working position.

From the above construction it will be seen that the adjustment of the sprocket P by means of the set-screws is a partial rotary adjustment around the shaft N, and as the sprocket P is geared by its chain to the sprocket Q, carrying the rollers $l$, the latter are adjusted when the sprocket P is adjusted, so as to properly time the action of the rollers $l$ upon the arms $m$.

Heretofore in machines having skeleton check-row spade-wheels it has been customary to hold the same down to work by the action of springs; but this has been found to be objectionable for the reason that in recrossing the field the spacing-markers would, owing to inequalities of the surface of the ground or its density, not properly register with the marks made in the first crossing and the corn would not be planted in straight rows. By my present construction, however, this is entirely obviated, as the spacing-wheels are not under any spring tension and they can rise and fall independently of each other, while still being held in true transverse alinement.

The primary object in making the spacing-wheels far enough apart to register in holes previously made is to have the spades seek these holes and thus keep the spacing true. Under spring tension the spades are often kept from seeking the hole by undue pressure, whereas with the present flexible construction the tendency of the blades to seek the hole is not interfered with whatever may be the character of the ground traveled over.

Having thus fully described my invention, I claim—

1. In a seed-planter, the combination of a spacing member constantly revoluble by direct contact with the ground, seed-depositing mechanism having in its train a clutch, clutch-connecting mechanism actuated by the spacing member, driving mechanism actuated by the traction of the machine, and connections between said driving mechanism and seed-depositing mechanism, whereby the spacing member first puts the clutch into gear and the traction of the machine then actuates the seed-depositing mechanism.

2. In a seed-planter, the combination of seed-depositing mechanism having in its train a clutch, clutch-connecting mechanism, a member constantly revoluble by the traction of the machine, and connections between the latter member and the clutch-connecting mechanism, substantially as described.

3. In a corn-planter and in combination, seed-spouts, seeding mechanism for depositing the seed in the spouts, revoluble check-row mechanism driven by direct contact with the ground, a revolving member constantly driven by the traction of the machine, valves in the spouts, a single shaft for operating the seeding mechanism and the valves, a clutch for said shaft controlled by the check-row mechanism and a connection between said clutch and the constantly-revolving member, whereby when the clutch is engaged the seeding mechanism is driven by the traction of the machine, substantially as described.

4. In a corn-planter, the combination with the rear frame, of a shaft journaled thereon, jointed arms extending from said shaft, a revoluble shaft supported on said arms, one or more spacing-wheels rigid on the last-named shaft and gearing connecting the shaft and planting mechanism, substantially as described.

5. In a corn-planter, the combination with the rear frame and runner-frame, of an intermediate transverse shaft carrying one or more spacing-wheels and journaled in arms flexibly united to the main frame, and gearing connecting the shaft and planting mechanism, substantially as described.

6. In a corn-planter, the combination with the rear frame, of a shaft journaled thereon, a lock-lever for oscillating and adjusting said shaft, jointed arms extending from said shaft, a revoluble shaft supported on said arms, one or more spacing-wheels, rigid on the last-named shaft, and gearing connecting the shaft and planting mechanism, substantially as described.

7. In a corn-planter, the combination of the shaft, L, journaled on the frame of the machine, the socket-pieces, $e$, rigidly secured to said shaft, the arms, $g$, pivoted in the socket-pieces, the shaft, N, journaled in the arms, $g$, the spacing-wheels, O, rigidly secured to the shaft, N, and gearing, connecting the shaft, N, and the planting mechanism of the machine, substantially as described.

8. In a corn-planter, the combination of the spacing-wheel shaft, N, tappets, $l$, rotated by the shaft, N, bell-crank, S, in the path of said tappets, valves in the seed-spouts, and connecting mechanism between the bell-crank and valve whereby the rotation of the tappets, actuates the valve, substantially as described.

9. In a corn-planter of the character described, the combination of valves in the spouts, spacing-wheels for actuating the same, tappet mechanism actuated by the spacing-wheels connecting gearing between the parts of which one of the members is a sprocket P, for driving the tappets and adjustable on its shaft by means of set-screws for timing the action of the tappets, substantially as described.

10. In the tappet mechanism of a check-row corn-planter, the combination with the tappets actuated by the check-row mechanism, of a two-part bell-crank, composed of the arms, $m$, $n$, with lug, $o$, and pendent arm, $p$, whereby said bell-crank can be thrown out of the path of the tappets, when desired, substantially as described.

JAMES B. JARMIN.

Witnesses:
BERT TULLIS,
CHAS. J. WATTS.